United States Patent
Lin et al.

(10) Patent No.: US 9,158,343 B2
(45) Date of Patent: Oct. 13, 2015

(54) TOUCH PANEL AND METHOD OF FABRICATING THE SAME

(71) Applicant: Au Optronics Corporation, Hsinchu (TW)

(72) Inventors: Cheng-Hsing Lin, Tainan (TW); Kuo-Hua Lan, New Taipei (TW); Wei-Hung Kuo, Hsinchu County (TW); Shih-Po Chou, New Taipei (TW)

(73) Assignee: Au Optronics Corporation, Hsinchu (TW)

( * ) Notice: Subject to any disclaimer, the term of this patent is extended or adjusted under 35 U.S.C. 154(b) by 98 days.

(21) Appl. No.: 13/974,030

(22) Filed: Aug. 22, 2013

(65) Prior Publication Data
US 2014/0340592 A1   Nov. 20, 2014

(30) Foreign Application Priority Data

May 20, 2013 (TW) .............................. 102117797 A (51) Int. Cl.
G06F 3/044 (2006.01)
G06F 1/16 (2006.01)

(52) U.S. Cl.
CPC .............. G06F 1/1692 (2013.01); G06F 3/044 (2013.01); *G06F 2203/04103* (2013.01)

(58) Field of Classification Search
CPC ........................ G06F 2203/04111; G06F 3/044
USPC ...................... 178/18.01–19.07; 345/173–178
See application file for complete search history.

(56) References Cited

U.S. PATENT DOCUMENTS

| 8,029,886 | B2 | 10/2011 | Nashiki et al. | |
| 8,227,077 | B2 | 7/2012 | Nashiki et al. | |
| 2008/0261030 | A1 | 10/2008 | Nashiki et al. | |
| 2009/0315854 | A1* | 12/2009 | Matsuo | 345/174 |
| 2010/0045613 | A1* | 2/2010 | Wu et al. | 345/173 |
| 2011/0057887 | A1* | 3/2011 | Lin et al. | 345/173 |
| 2012/0012370 | A1 | 1/2012 | Nashiki et al. | |
| 2013/0277195 | A1* | 10/2013 | Chang et al. | 200/600 |

FOREIGN PATENT DOCUMENTS

| TW | 201009659 | 3/2010 |
| TW | 201020870 | 6/2010 |
| TW | 201110003 | 3/2011 |
| TW | 201111174 | 4/2011 |
| TW | 201312402 | 3/2013 |

* cited by examiner

*Primary Examiner* — Michael Pervan
(74) *Attorney, Agent, or Firm* — Jianq Chyun IP Office (57) ABSTRACT

A touch panel includes a substrate, a first patterned conductive layer, a patterned passivation layer, and a second patterned conductive layer. The first patterned conductive layer is located on the substrate, and the first patterned conductive layer includes a plurality of first sensing pads and a plurality of second sensing pads, wherein a gap is formed between adjacent first and second sensing pads. The patterned passivation layer is located on the first patterned conductive layer, and the patterned passivation layer covers the gap and exposes at least a portion of each first sensing pad and at least a portion of each second sensing pad. The second patterned conductive layer is located on the patterned passivation layer.

17 Claims, 13 Drawing Sheets

TOUCH PANEL AND METHOD OF FABRICATING THE SAME

CROSS-REFERENCE TO RELATED APPLICATION

This application claims the priority benefit of Taiwan application serial no. 102117797, filed on May 20, 2013. The entirety of the above-mentioned patent application is hereby incorporated by reference herein and made a part of this specification.

BACKGROUND

1. Field of the Invention

The present invention relates to a panel and a method for fabricating the same. More particularly, the present invention relates to a touch panel and a method for fabricating the same.

2. Description of Related Art

According to different sensing principles, touch panels may be categorized into resistant touch panels, capacitive touch panels, optical touch panels, sonic wave touch panels, and electromagnetic touch panels etc. Among the touch panels, the projective capacitive touch panels have drawn much attention due to rapid growth in smartphone sales.

Figure 1A:
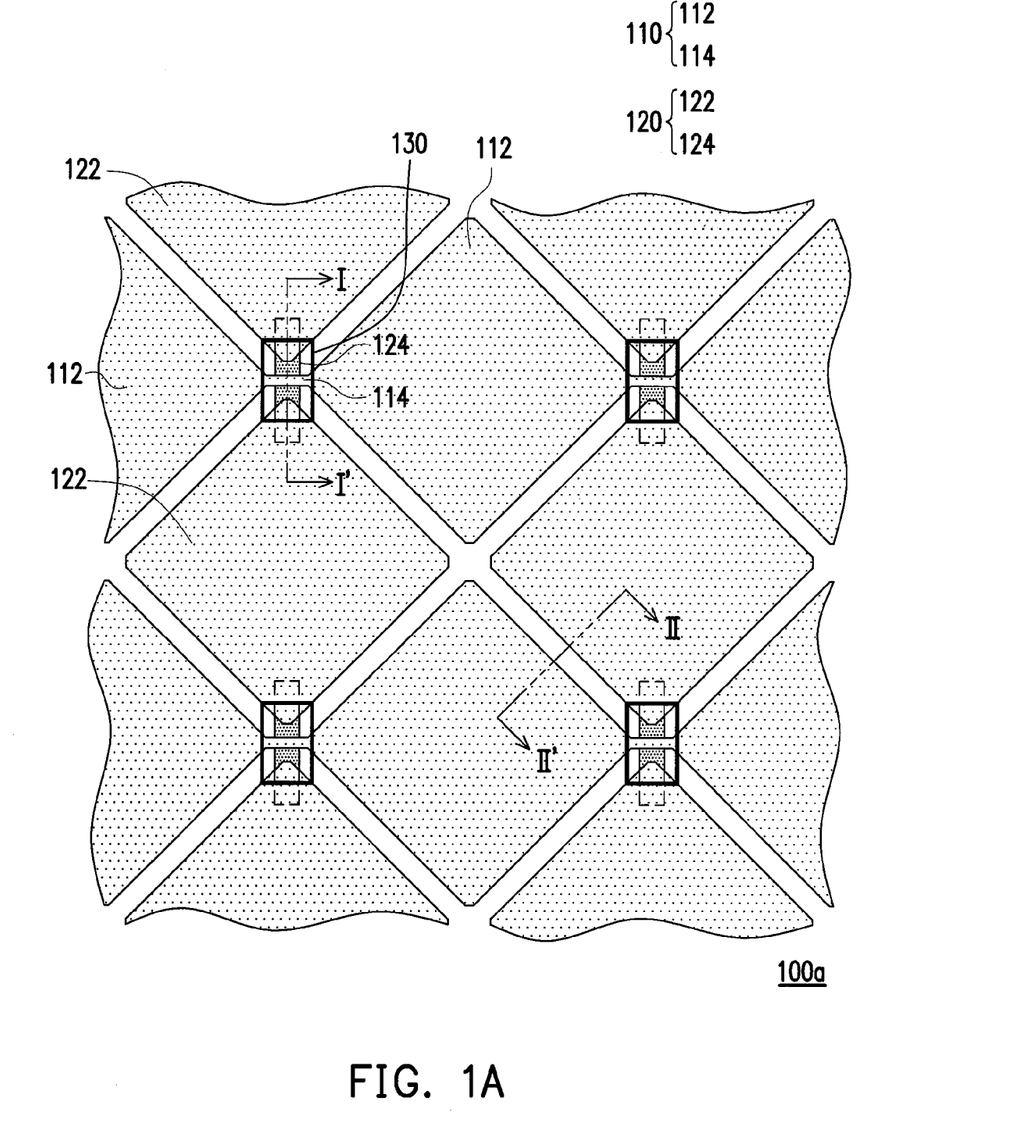
FIG. 1A is a schematic top view showing a conventional island-type projective capacitive touch panel.
Figure 1B:
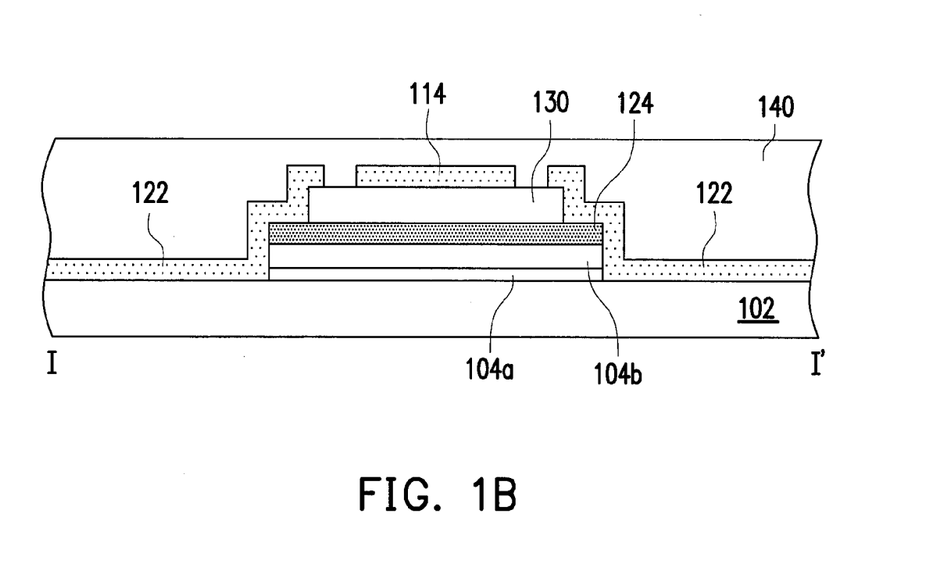
FIG. 1B is a schematic cross-sectional view along line I-I' of FIG. 1A.
Figure 1C:
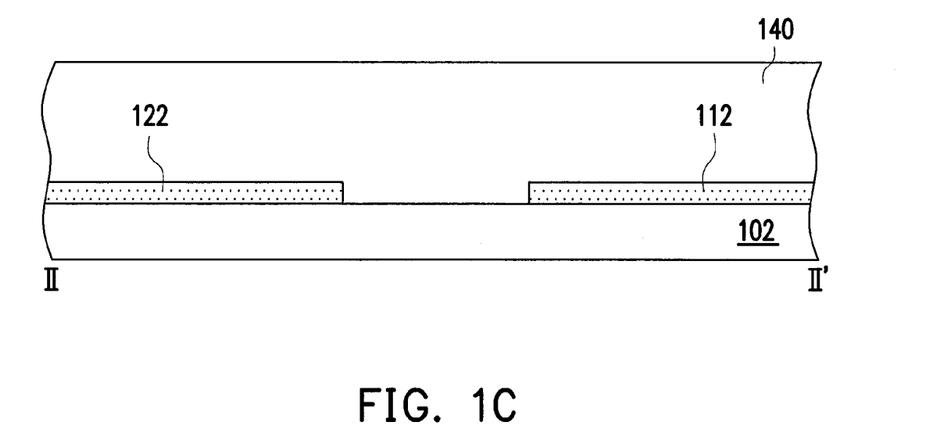
FIG. 1C is a schematic cross-sectional view along line II-II' of FIG. 1A.

Typically, the projective capacitive touch panels may be categorized into island-type and via-type projective capacitive touch panels according to how a passivation layer is arranged between conductive layers. FIG. 1A is a schematic top view showing a conventional island-type projective capacitive touch panel. FIG. 1B and FIG. 1C are schematic cross-sectional views respectively along lines I-I' and II-II' of FIG. 1A. Referring to FIG. 1A through FIG. 1C, a projective capacitive touch panel 100a includes a substrate 102, buffer layers 104a and 104b, a plurality of first sensing series 110, a plurality of second sensing series 120, a passivation layer 130 and a covering layer 140 serving to insulate the first sensing series 110 from the second sensing series 120. Each of the first sensing series 110 includes a plurality of first sensing pads 112 and a plurality of first bridging lines 114 located among the first sensing pads 112. Each of the second sensing series 120 includes a plurality of second sensing pads 122 and a plurality of second bridging lines 124 located among the second sensing pads 122.

In the island-type projective capacitive touch panel 100a illustrated in FIG. 1A through FIG. 1C, the passivation layer 130 is patterned as island-shaped and arranged between the second sensing pads 122 and the first bridging lines 114. Thus, when a material of the passivation layer 130 is similar to a material of the buffer layers 104a and 104b, the buffer layers 104a and 104b serving as optical index-match layers are also removed in a fabricating process for patterning the passivation layer 130, which results in reduced adjustment flexibility for optical characteristics of the projective capacitive touch panel 100a.

Figure 2A:
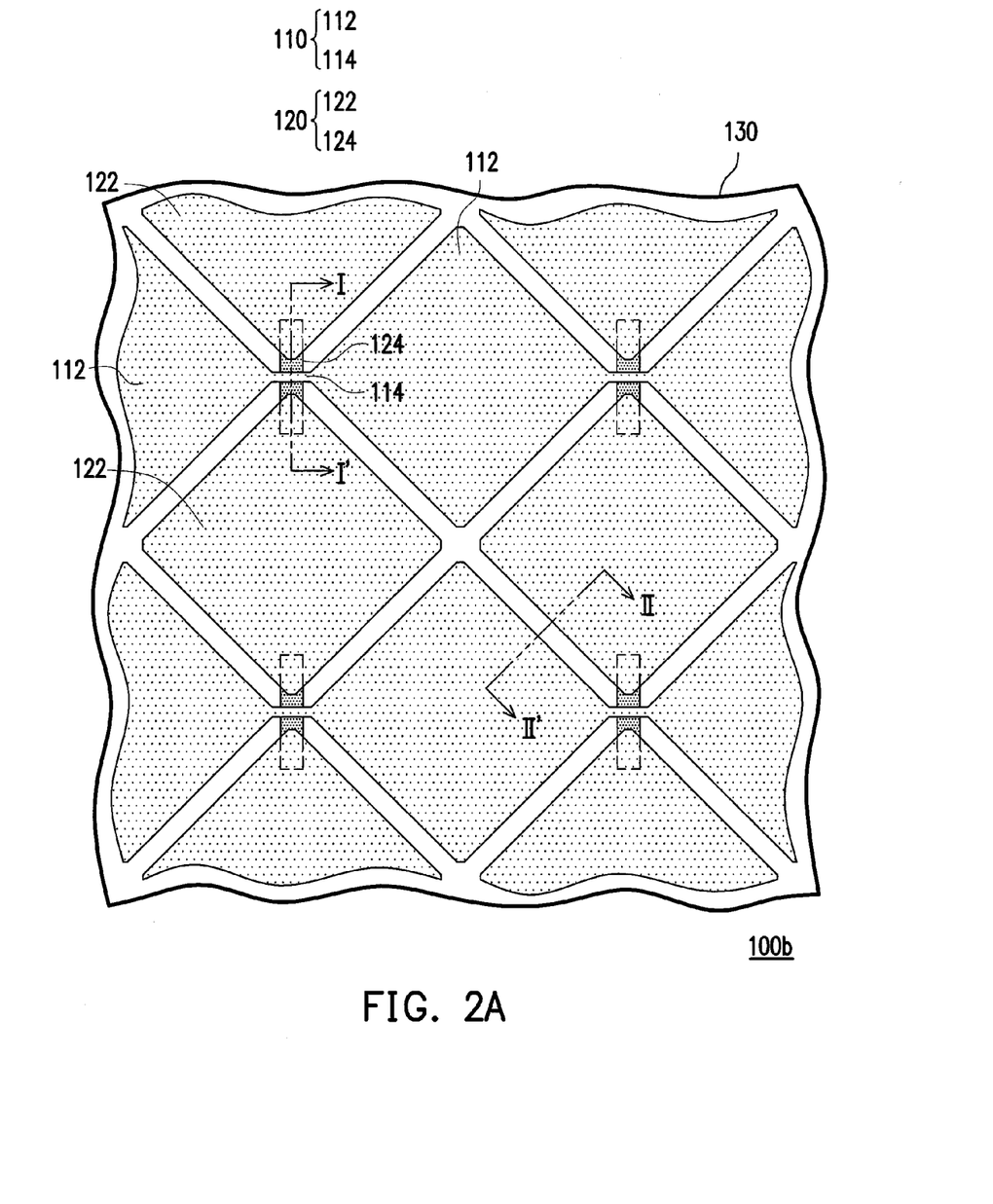
FIG. 2A is a schematic top view showing a conventional via-type projective capacitive touch panel.
Figure 2B:
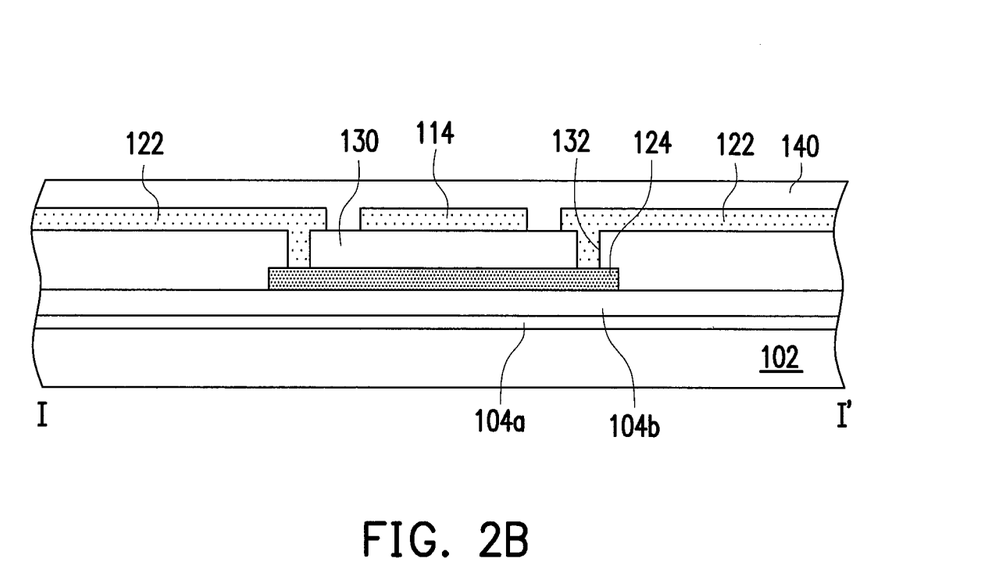
FIG. 2B is a schematic cross-sectional view along line I-I' of FIG. 2A.
Figure 2C:
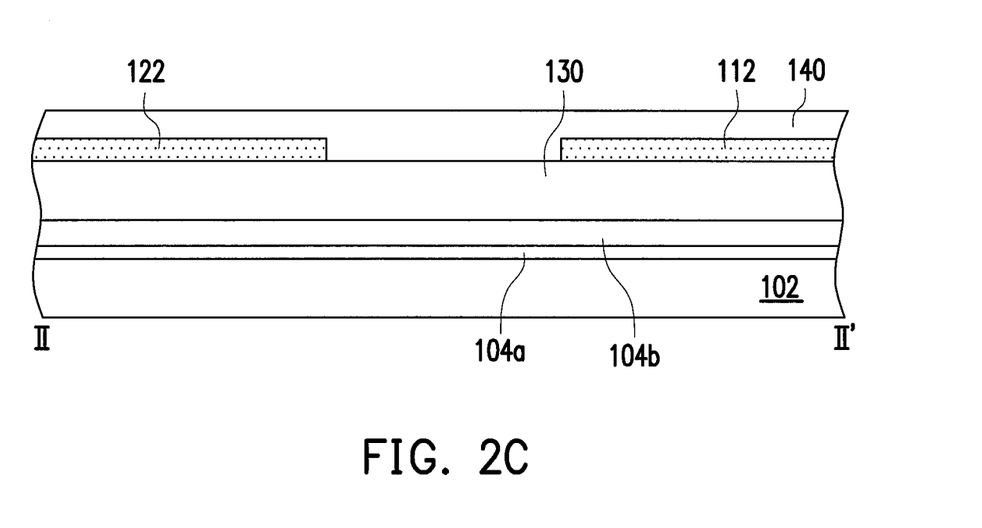
FIG. 2C is a schematic cross-sectional view along line II-II' of FIG. 2A.

FIG. 2A is a schematic top view showing a conventional via-type projective capacitive touch panel. FIG. 2B and FIG. 2C are schematic cross-sectional view respectively along lines I-I' and II-II' of FIG. 2A. Referring to FIG. 2A through FIG. 2C, a projective capacitive touch panel 100b has elements that are substantially identical to those of the island-type projective capacitive touch panel 100a, and a major difference therebetween lies in the passivation layer 130 covers the first bridging lines 114, and the first sensing pads 112 are electrically connected with the first bridging lines 114 through via holes 132 in the passivation layer 130. Since the passivation layer 130 entirely covers the substrate 102, optical stability of the via-type projective capacitive touch panel 100b is easily influenced by a thickness of the passivation layer 130. As a result, the optical stability of the via-type projective capacitive touch panel 100b may be even worse than that of the island-type projective capacitive touch panel 100a.

Accordingly, the way by which the passivation layer is arranged would influence optical characteristics of the projective capacitive touch panel. Therefore, how to design a projective capacitive touch panel with good optical characteristics is a major subject to be worked on by technicians and research and development personnel in the field of the present invention.

SUMMARY

The present invention provides a touch panel with good optical characteristics.

The present invention provides a method for fabricating a touch panel having good optical characteristics.

The touch panel of the present invention includes a substrate, a first patterned conductive layer, a patterned passivation layer and a second patterned conductive layer. The first patterned conductive layer is located on the substrate and includes a plurality of first sensing pads and a plurality of second sensing pads. A gap is formed between two adjacent first sensing pad and second sensing pad. The patterned passivation layer is located on the first patterned conductive layer, covers the gaps, and exposes at least a portion of each first sensing pad and at least a portion of each second sensing pad. The second patterned conductive layer is located on the patterned passivation layer.

In an embodiment of the present invention, the touch panel further includes an insulating layer located on the first patterned conductive layer, the patterned passivation layer and the second patterned conductive layer. The first patterned conductive layer further includes a plurality of first bridging lines, and each of the first bridging lines is electrically connected with two adjacent first sensing pads. The second patterned conductive layer includes a plurality of second bridging lines, and each of the second bridging lines is electrically connected with two adjacent second sensing pads. The patterned passivation layer is further located between the first bridging lines and the second bridging lines.

In an embodiment of the present invention, a buffer layer is further included and located on the substrate. The first patterned conductive layer is located on the buffer layer. The gaps expose the buffer layer, and a material of the buffer layer includes $SiO_2$, $SiN_x$, $SiO_xN_y$, $Nb_2O_5$, $MgF_2$, $Al_2O_3$, $CeF_3$, $ZrO_2$, $TiO_2$, $Ta_2O_5$, ZnS or a combination thereof.

In an embodiment of the present invention, a material of the patterned passivation layer includes $SiO_2$, $SiN_x$, $SiO_xN_y$, $Nb_2O_5$, $MgF_2$, $Al_2O_3$, $CeF_3$, $ZrO_2$, $TiO_2$, $Ta_2O_5$, ZnS or a combination thereof, and a thickness of the patterned passivation layer substantially ranges from 0.3 um to 2 um.

In an embodiment of the present invention, the patterned passivation layer is mesh-shaped. The second patterned conductive layer includes a plurality of dummy patterns. At least one of the dummy patterns is located between the two adjacent first sensing pad and second sensing pad and insulated from the two adjacent first sensing pad and second sensing pad. A shortest horizontal distance between the at least one of the dummy patterns and one of the two adjacent first sensing pad and second sensing pad ranges from 0 um to 15 um.

In an embodiment of the present invention, edge portions of the first sensing pads and the second sensing pads are substantially covered by the patterned passivation layer.

In an embodiment of the present invention, a central portion of the top surface of each of the first sensing pads and the second sensing pads is exposed by the patterned passivation layer.

The method for fabricating a touch panel of the present invention includes steps as follows. A first patterned conductive layer is formed on a substrate. The first patterned conductive layer includes a plurality of first sensing pads and a plurality of second sensing pads. A gap is formed between two adjacent first sensing pad and second sensing pad. A patterned passivation layer is formed on the first patterned conductive layer, covers the gaps, and exposes at least a portion of each first sensing pad and at least a portion of each second sensing pad. A second patterned conductive layer is formed on the patterned passivation layer.

In an embodiment of the present invention, the first patterned conductive layer further includes a plurality of first bridging lines, and each of the first bridging lines is electrically connected with two adjacent first sensing pads. The second patterned conductive layer includes a plurality of second bridging lines, and each of the second bridging lines is electrically connected with two adjacent second sensing pads. The patterned passivation layer is further located between the first bridging lines and the second bridging lines.

In an embodiment of the present invention, a buffer layer is further formed on the substrate, the first patterned conductive layer is located on the buffer layer, and the gaps expose the buffer layer. A material of the buffer layer includes $SiO_2$, $SiN_x$, $SiO_xN_y$, $Nb_2O_5$, $MgF_2$, $Al_2O_3$, $CeF_3$, $ZrO_2$, $TiO_2$, $Ta_2O_5$, ZnS or a combination thereof.

In an embodiment of the present invention, an insulating layer is further formed on the first patterned conductive layer, the patterned passivation layer and the second patterned conductive layer. A material of the patterned passivation layer includes $SiO_2$, $SiN_x$, $SiO_xN_y$, $Nb_2O_5$, $MgF_2$, $Al_2O_3$, $CeF_3$, $ZrO_2$, $TiO_2$, $Ta_2O_5$, ZnS or a combination thereof, and a thickness of the patterned passivation layer substantially ranges from 0.3 um to 2 um.

In an embodiment of the present invention, the second patterned conductive layer includes a plurality of dummy patterns. At least one of the dummy patterns is located between the two adjacent first sensing pad and second sensing pad and insulated from the two adjacent first sensing pad and second sensing pad. A shortest horizontal distance between the at least one of the dummy patterns and one of the two adjacent first sensing pad and second sensing pad ranges from 0 um to 15 um.

In an embodiment of the present invention, edge portions of the first sensing pads and the second sensing pads are substantially covered by the patterned passivation layer.

In an embodiment of the present invention, a central portion of the top surface of each of the first sensing pads and the second sensing pads is exposed by the patterned passivation layer.

To sum up, in the touch panel and the method for fabricating the same of the present invention, a gap is formed between each two adjacent first and second sensing pads, and the patterned passivation layer covers the gaps and exposes at least a portion of each first sensing pad and at least a portion of each second sensing pad. By doing so, the patterned passivation layer protects the layers exposed from the gaps, so that the layers will not be damaged and inherent characteristics thereof are retained. Moreover, since the patterned passivation layer does not entirely cover the substrate, the optical characteristics of the touch panel will not be easily influenced by the thickness of the patterned passivation layer. Accordingly, the touch panel has good optical characteristics and optical stability.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

Figure 3A:
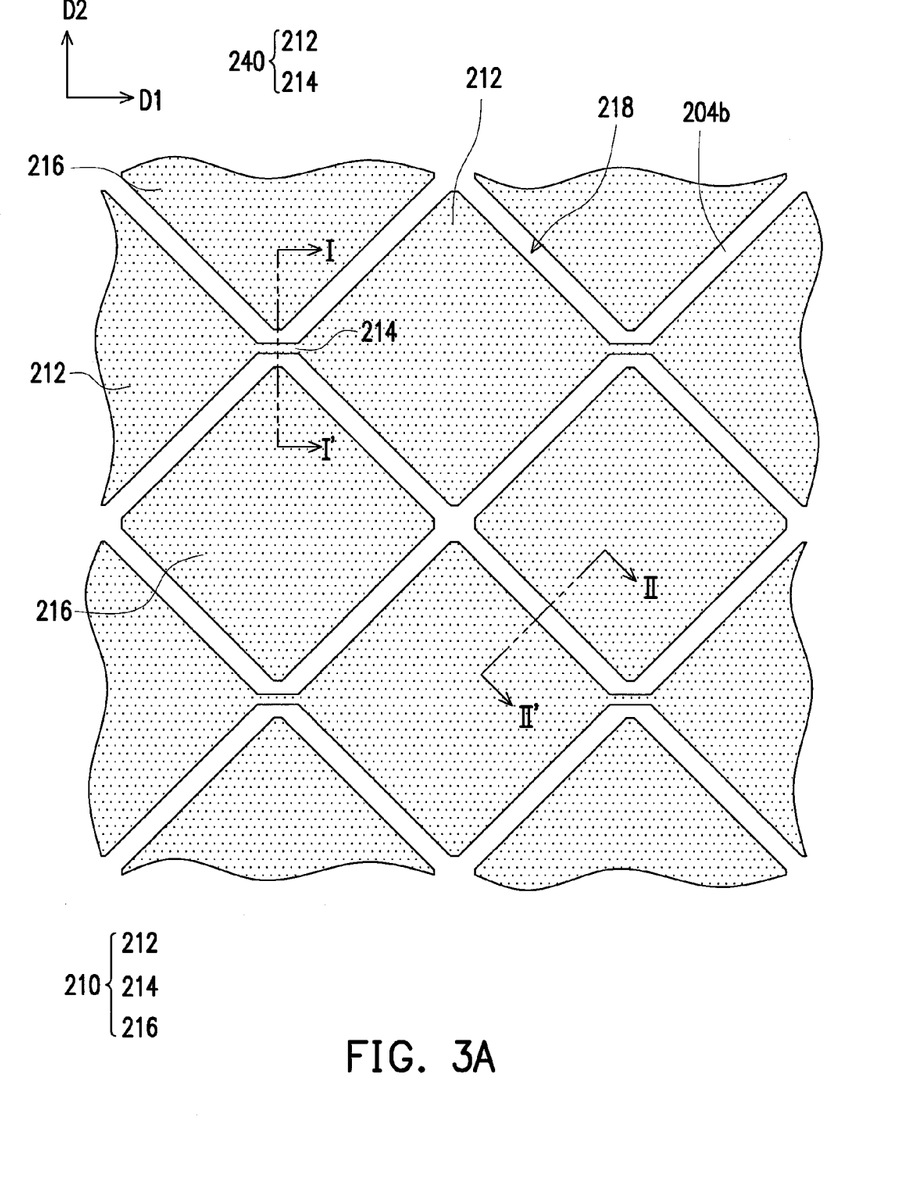
FIG. 3A through FIG. 3C are schematic top view showing a fabricating method of a touch panel according to an embodiment of the present invention.
Figure 3B:
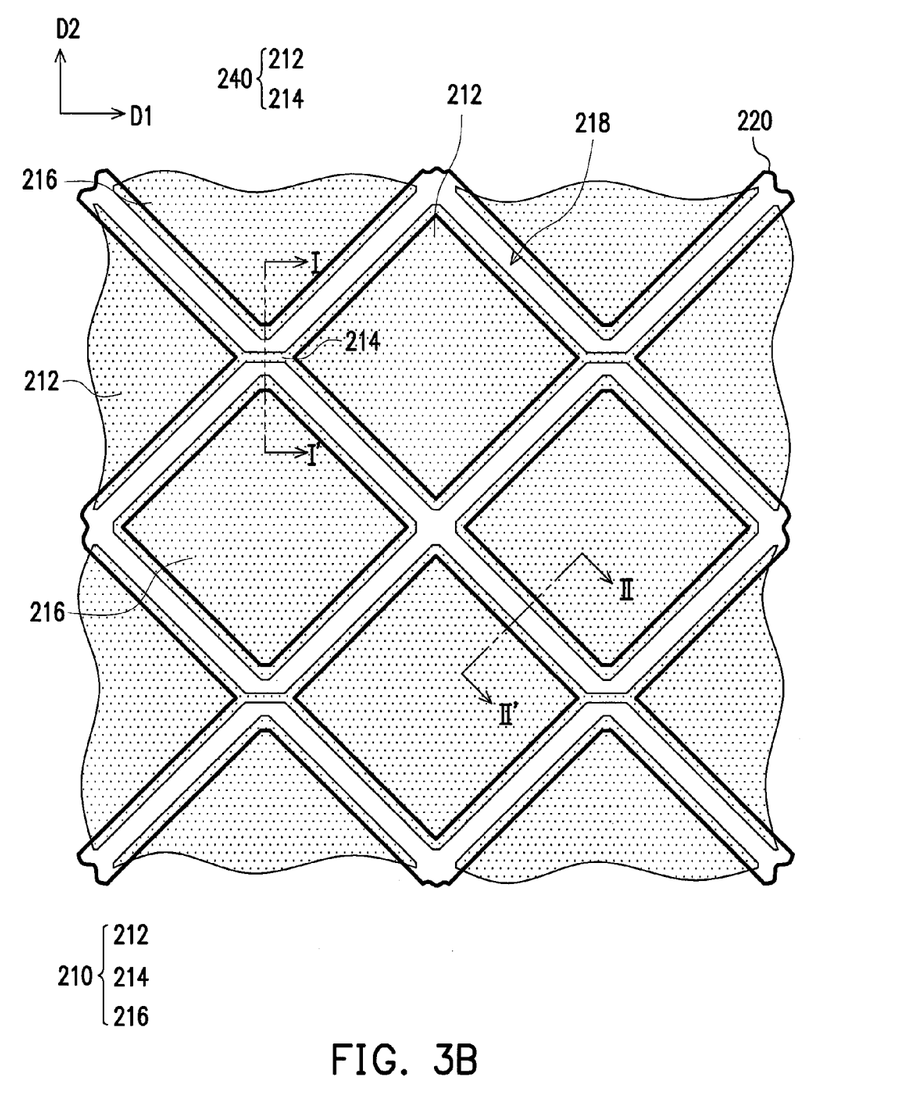
Figure 3C:
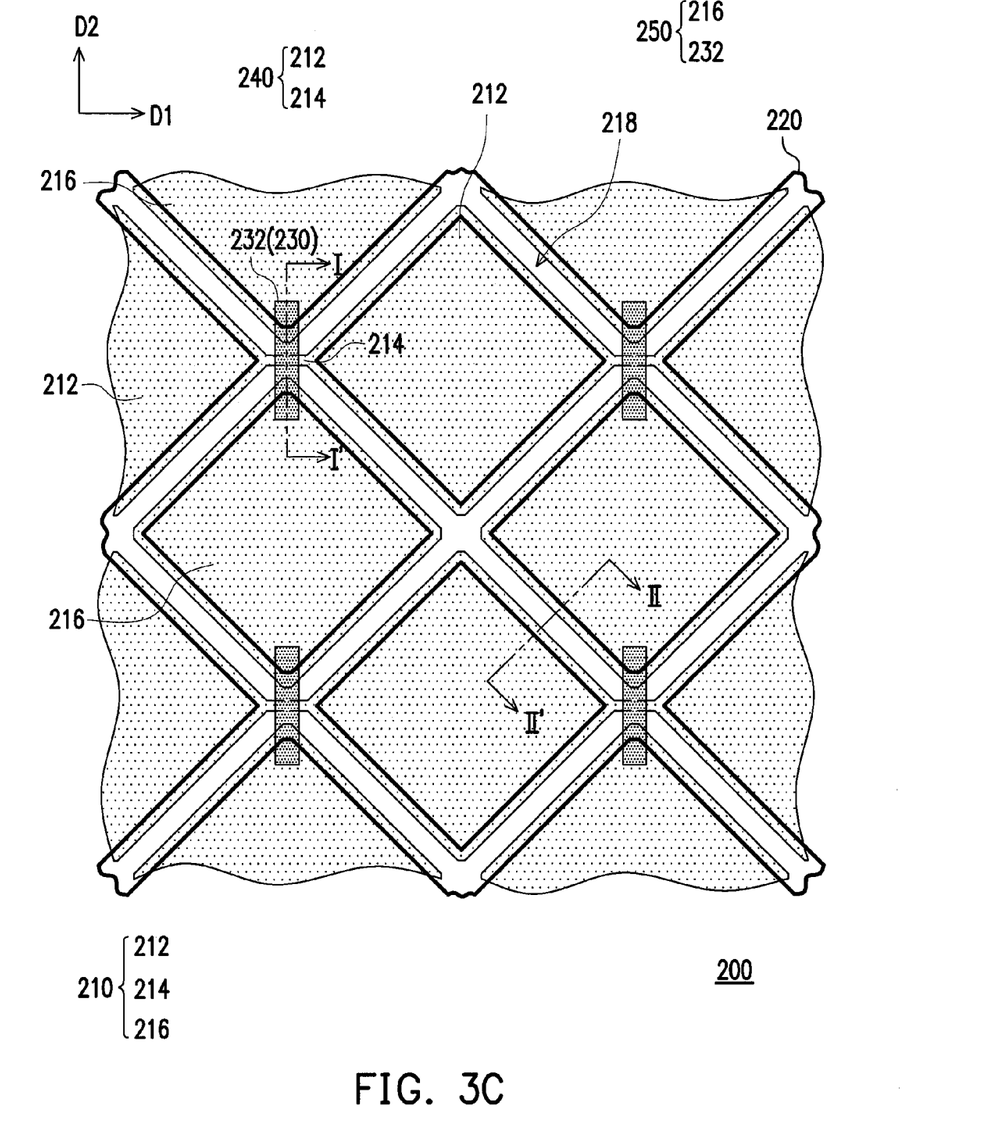
Figure 4A:
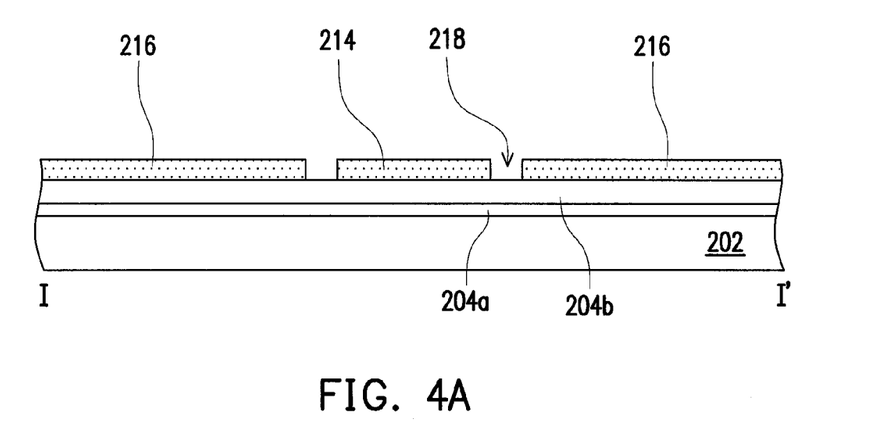
FIG. 4A through FIG. 4D are schematic cross-sectional views along line I-I' of FIG. 3A through FIG. 3C showing the fabricating method of the touch panel.

FIG. 3A through FIG. 3C are schematic top view showing a fabricating method of a touch panel according to an embodiment of the present invention. FIG. 4A through FIG. 4D are schematic cross-sectional views along line I-I' of FIG. 3A through FIG. 3C showing the fabricating method of the touch panel, and FIG. 5A through FIG. 5D are schematic cross-sectional views along line II-II' of FIG. 3A through FIG. 3C showing the fabricating method of the touch panel. Therein, the insulating layer 260 is omitted in FIG. 3C for clarity, and thus, the top views in the FIG. 4C through FIG. 4D and FIG. 5C through FIG. 5D are all based on FIG. 3C. Referring to FIG. 3A, FIG. 4A and FIG. 5A simultaneously, a substrate 202 is first provided. In the present embodiment, the substrate 202 is, for example, a glass substrate, a plastic substrate, a flexible substrate or any other type of substrate.

Then, a first patterned conductive layer 210 is formed on the substrate 202. The first patterned conductive layer 210 includes a plurality of first sensing pads 212 and a plurality of second sensing pads 216. A gap 218 is between two adjacent ones of the first sensing pads 212 and the second sensing pads 216. In other words, a gap 218 is between two adjacent first sensing pads 212, between two adjacent second sensing pads 216, and/or between one first sensing pad 212 and one second sensing pad 216 that are adjacent to each other. In the present embodiment, for example, a first buffer layer 204a and a second buffer layer 204b are selectively formed in sequence on the substrate 202, and the first patterned conductive layer 210 is then formed on the first buffer layer 204a and the second buffer layer 204b in this step. Thereby, the gaps 218 expose the second buffer layer 204b.

In the present embodiment, the first buffer layer 204a and/or the second buffer layer 204b serves as, for example, a refractive index-matching layer. A method for forming the first buffer layer 204a and/or the second buffer layer 204b is, for example, a chemical vapor deposition (CVD), and a material of the first buffer layer 204a and/or the second buffer layer 204b is, for example, an inorganic material, including $SiO_2$, $SiN_x$, $SiO_xN_y$, $Nb_2O_5$, $MgF_2$, $Al_2O_3$, $CeF_3$, $ZrO_2$, $TiO_2$, $Ta_2O_5$, ZnS or a combination thereof. In another embodiment, the material of the first buffer layer 204a and/or the second buffer layer 204b may also be an organic material, such as a polymeric material containing nitrogen, oxygen, silicon or carbon or combination thereof, a polymer material such as epoxy resin and acrylic resin or a hard coating. Moreover, a high refractive material such as titanium may be doped in the aforementioned material, but the present invention is not limited thereto. It is to be mentioned that even though two buffer layers are illustrated in the present embodiment as an example, in other embodiments, the arrangement of the first buffer layer 204a and/or the second buffer layer 204b between the substrate 202 and the first patterned conductive layer 210 may be omitted as required, or alternatively, one or more buffer layers may be disposed between the substrate 202 and the first patterned conductive layer 210.

The first patterned conductive layer 210 is formed by, for example, a deposition process, a photolithography process and an etching process. In the present embodiment, the first patterned conductive layer 210 further includes, for example, a plurality of first bridging lines 214. Each first bridging line 214 is electrically connected with two adjacent first sensing pads 212. First sensing series 240 are formed by the plurality of first sensing pads 212 and the plurality of first bridging lines 214. Each first sensing series 240 extends along a first direction D1. In the present embodiment, the first direction D1 is, for example, the x-axis direction. A material of the first patterned conductive layer 210 is, for example, a non-transparent conductive material, a transparent conductive material or a stacked layer thereof. The non-transparent conductive material may be metal, such as gold, silver, copper, aluminum, molybdenum, titanium, chromium, cadmium, tungsten, zinc, nickel or an alloy thereof. The transparent conductive material may be conductive metal oxide, such as indium-tin oxide (ITO), indium-zinc oxide (IZO) or any other transparent conductive metal oxide. In addition, even though the first sensing pads 212 and the second sensing pads 216 are illustrated as rhombus sensing pads, for example, but the present invention is not limited thereto. In the present embodiment, a width of a gap 218 ranges, for example, from 20 um to 100 um, and the gaps 218 are, for example, connected with one another in a mesh shape.

Figure 4B:
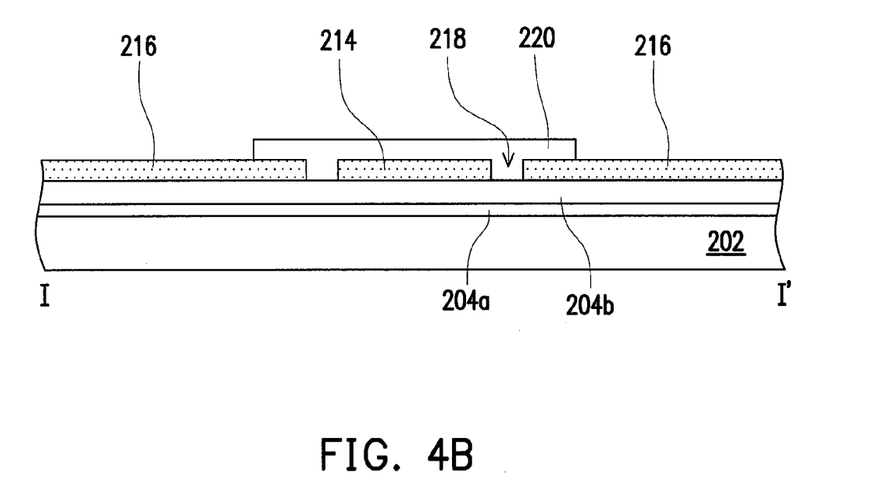
Figure 5A:
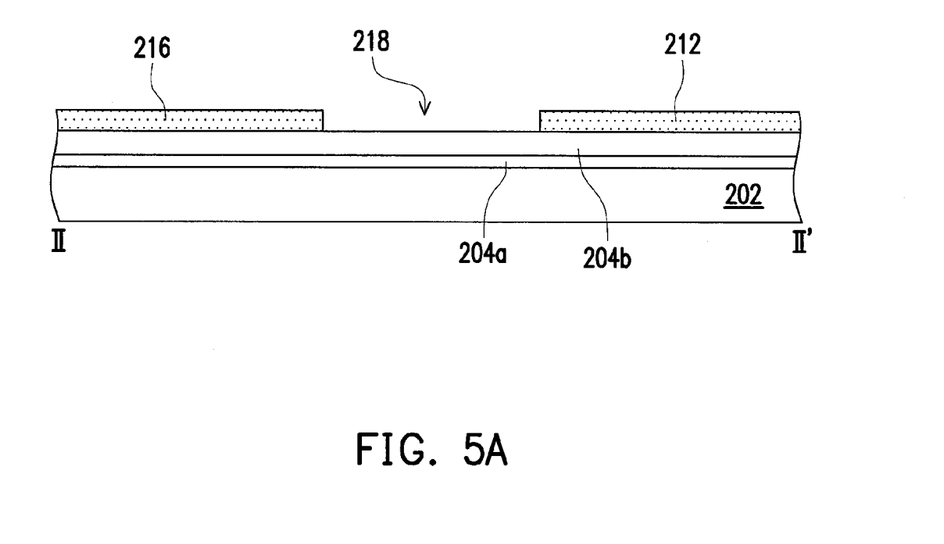
FIG. 5A through FIG. 5D are schematic cross-sectional views along line II-II' of FIG. 3A through FIG. 3C showing the fabricating method of the touch panel.
Figure 5B:
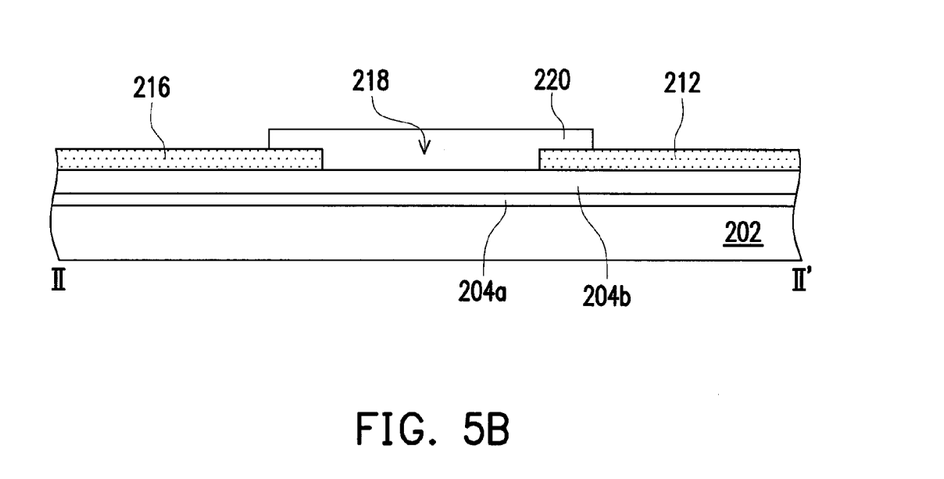

Referring to FIG. 3B, FIG. 4B and FIG. 5B simultaneously, a patterned passivation layer 220 is then formed on and contacts the first patterned conductive layer 210. The patterned passivation layer 220, for example, entirely covers the gaps 218, and exposes at least a portion of each first sensing pad 212 and at least a portion of each second sensing pad 216. For example, a portion of the patterned passivation layer 220 is completely filled in the gaps 218 so that the side surfaces and edge portions of the first sensing pads 212 and/or the second sensing pads 216 are substantially covered by the patterned passivation layer 220. A central portion of the top surface of each of the first sensing pads 212 and/or the second sensing pads 216 is exposed by the patterned passivation layer 220. In the present embodiment, a method for forming the patterned passivation layer 220 is, for example, to first form a passivation material layer (not shown) on the substrate 202 to fill in the gaps 218 and cover the substrate 202 by a deposition process and then, for example, to pattern the passivation material layer by a photolithography process and an etching process to form the patterned passivation layer 220 exposing each first sensing pad 212 and each second sensing pad 216. In the present embodiment, the patterned passivation layer 220, for example, is entirely filled in the gaps 218 and entirely covers edge portions of the first sensing pads 212 and second sensing pads 216. The patterned passivation layer 220 is, for example, mesh-shaped. In the present embodiment, an example where a large portion of area of each first sensing pad 212 and a large portion of area of the second sensing pad 216 are exposed from the patterned passivation layer 22 is illustrated, however, in other embodiments, a suitable portion of area of each first sensing pad 212 and a suitable portion of area of each second sensing pad 216 are exposed from the patterned passivation layer 220 as required. It is to be noted that since the patterned passivation layer 220 covers the gaps 218, the first buffer layer 204a and the second buffer layer 204b exposed from the gap 218 are accordingly protected. Therefore, the etching process for forming the patterned passivation layer 220 or other subsequent processes will not lead to damages on the first buffer layer 204a and the second buffer layer 204b. Thereby, a goal of optimizing optical performance of the touch panel 200 may be achieved. Moreover, the patterned passivation layer 220 may avoid formation of air gaps due to an undercut phenomenon occurring beneath the first sensing pads 212 and the second sensing pads 216 in the etching process, and as a result, the first sensing pads 212 and the second sensing pads 216 become obviously visible. Accordingly, the first buffer layer 204a and the second buffer layer 204b may provide good and stable optical characteristics, such as a good refractive index, so as to enhance adjustment flexibility for optical characteristics of the touch panel 200.

In the present embodiment, the patterned passivation layer 220 serves as, for example, a refractive index-matching layer. A material of the patterned passivation layer 220 is, for example, identical or similar to that of the first buffer layer 204a and the second buffer layer 204b. The material of the patterned passivation layer 220 is, for example, an inorganic material, including $SiO_2$, $SiN_x$, $SiO_xN_y$, $Nb_2O_5$, $MgF_2$, $Al_2O_3$, $CeF_3$, $ZrO_2$, $TiO_2$, $Ta_2O_5$, ZnS or a combination thereof, and a thickness of the patterned passivation layer 220 substantially ranges, for example, from 0.3 um to 2 um. In another embodiment, the material of the patterned passivation layer 220 may also be an organic material.

Figure 4C:
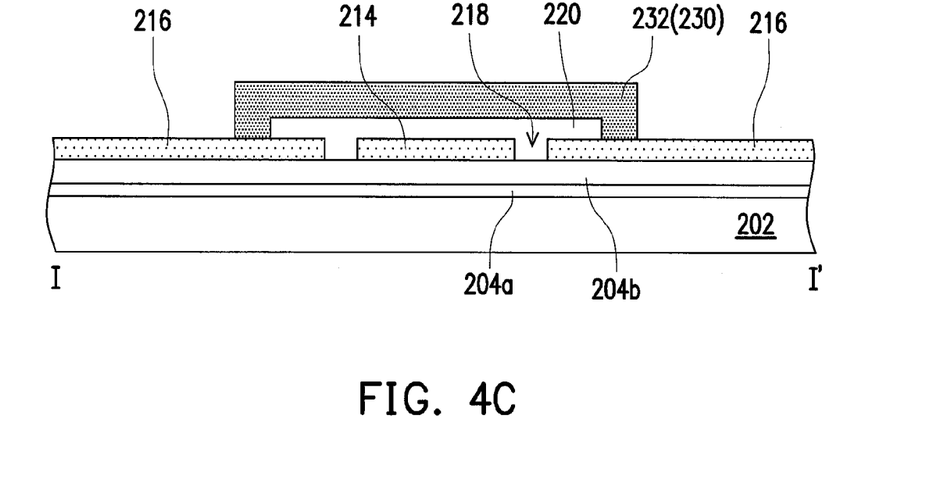
Figure 5C:
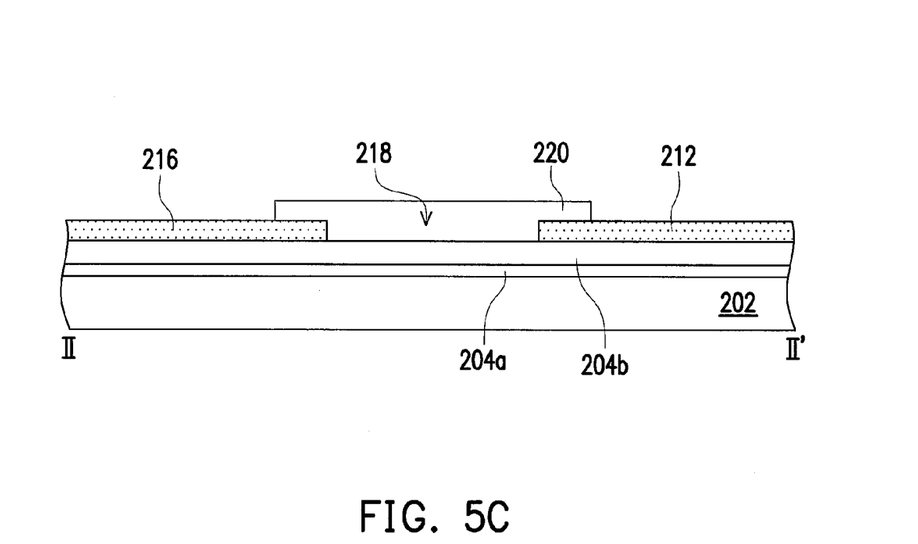

Referring to FIG. 3C, FIG. 4C and FIG. 5C simultaneously, a second patterned conductive layer 230 is then formed on the patterned passivation layer 220. A method for forming the second patterned conductive layer 230 is to perform, for example, a deposition process, a photolithography process and an etching process. In the present embodiment, the second patterned conductive layer 230 includes, for example, a plurality of second bridging lines 232, and each second bridging line 232 is electrically connected with two adjacent second sensing pads 216. The patterned passivation layer 220 is, for example, further located between the first bridging lines 214 and the second bridging lines 232. In the present embodiment, second sensing series 250 are formed by the plurality of second sensing pads 216 and the plurality of second bridging lines 232. Each second sensing series 250 extends along a second direction D2. In the present embodiment, the second direction D2 is, for example, the y-axis direction. The first sensing series 240 and the second sensing series 250 are insulated from each other by the patterned passivation layer 220. In this step, each second bridging line 232 is formed between two adjacent second sensing pads 216, and thus the cross-sectional view of FIG. 5C depicted along line II-II' of FIG. 3C is identical to that of FIG. 5B depicted along line II-II' of FIG. 3B.

A material of the second patterned conductive layer 230 is a non-transparent conductive material, a transparent conductive material or a stacked layer thereof. The non-transparent conductive material may be metal, such as gold, silver, copper, aluminum, molybdenum, titanium, chromium, cadmium, tungsten, zinc, nickel or an alloy thereof. The transparent conductive material may be conductive metal oxide, such as indium-tin oxide (ITO), indium-zinc oxide (IZO) or any other transparent conductive metal oxide.

Figure 4D:
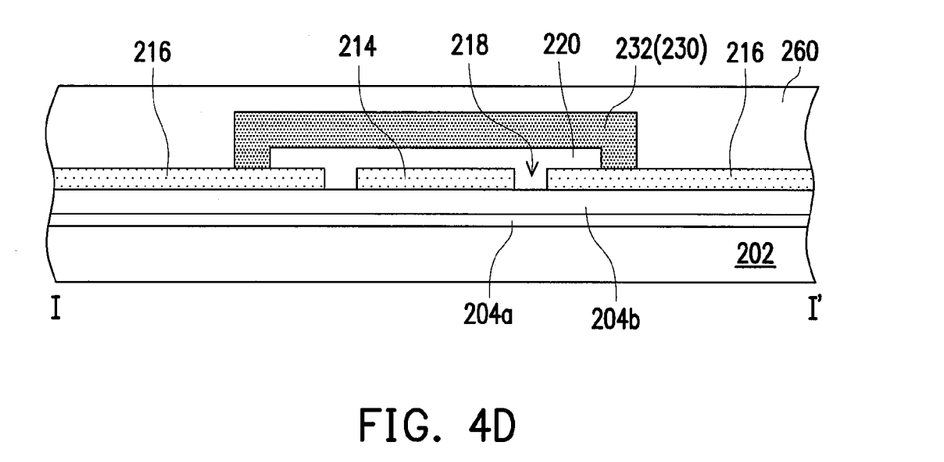
Figure 5D:
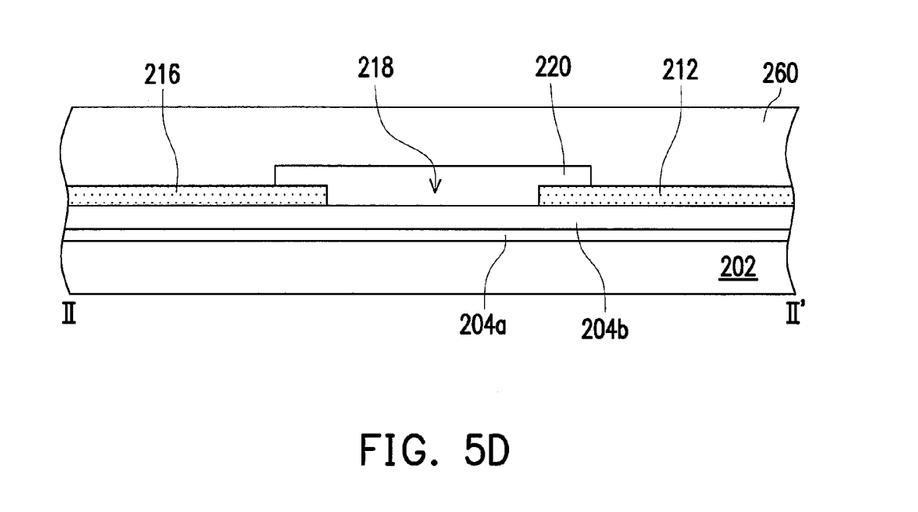

Thereafter, referring to FIG. 3C, FIG. 4D and FIG. 5D simultaneously, in the present embodiment, an insulating layer 260 is further formed on the first patterned conductive layer 210, the patterned passivation layer 220 and the second patterned conductive layer 230. A material of the insulating layer 260 is, for example, $SiO_2$, $SiN_x$, $SiO_xN_y$ or any other suitable material.

In the present embodiment, the touch panel 200 is, for example, a projective capacitive touch panel. The touch panel 200 includes the substrate 202, the first patterned conductive layer 210, the patterned passivation layer 220 and the second patterned conductive layer 230. The first patterned conductive layer 210 including the plurality of first sensing pads 212 and the plurality of second sensing pads 214 is located on the substrate 202. The gap 218 is formed between two adjacent first sensing pad 212 and second sensing pad 214. In the present embodiment, the touch panel 200 further includes the first buffer layer 204a and the second buffer layer 204b on the substrate 202. The first patterned conductive layer 210 is, for example, located on the first buffer layer 204a and the second buffer layer 204b, and each gap 218, for example, exposes the second buffer layer 204b. The patterned passivation layer 220 is located on the first patterned conductive layer 210, entirely covers the gaps 218 and exposes at least a portion of each first sensing pad 212 and at least a portion of each second sensing pad 216. The second patterned conductive layer 230 is located on the patterned passivation layer 220. In the present embodiment, the second patterned conductive layer 230 includes, for example, the plurality of second bridging lines 232. Each second bridging line 232 is electrically connected with two adjacent second sensing pads 216. The patterned passivation layer 220 is, for example, further located between the first bridging lines 214 and the second bridging lines 232. In the present embodiment, the touch panel 200 includes, for example, the insulating layer 260 located on the first patterned conductive layer 210, the patterned passivation layer 220 and the second patterned conductive layer 230.

In the touch panel and the method for fabricating the same in the present embodiment, the gap 218 is formed between two adjacent first sensing pad 212 and second sensing pad 216, and the patterned passivation layer 220 entirely covers the gaps 218 and expose at least a portion of each first sensing pad 212 and at least a portion of each second sensing pad 216. By doing so, the second buffer layer 204b exposed by the gaps 218 is protected by the patterned passivation layer 220, to avoid damages on the first buffer layer 204a and the second buffer layer 204b due to the etching process for forming the patterned passivation layer 220 or other subsequent processes. Accordingly, the material selection for the patterned passivation layer 220, the first buffer layer 204a and the second buffer layer 204b is more flexible. For instance, an adaptive index-match material may be selected for allowing at least one index-match layer to be disposed between the first patterned conductive layer 210 and the substrate 202, which facilitates optical adjustment for products. Moreover, a chemical vapor deposition (CVD) machine for fabricating thin film transistors may be utilized to form the patterned passivation layer 220. Accordingly, the patterned passivation layer 220 has an advantage of low production cost.

On the other hand, since the patterned passivation layer 220 does not entirely cover the substrate 202, but merely covers the gaps 218 and the edge portions of the sensing pads 212 and 216. As a result, the optical characteristics of the touch panel 200 are not easily influenced by the thickness of the patterned passivation layer 220 and lead to good optical stability of the touch panel 200. In other words, with the arrangement of the patterned passivation layer 220, the touch panel 200 may include more index-match layers, and the optical characteristics of the touch panel 200 are not easily influenced by the thickness of the patterned passivation layer 220. Accordingly, the touch panel 200 has better optical characteristics and optical stability.

Figure 6A:
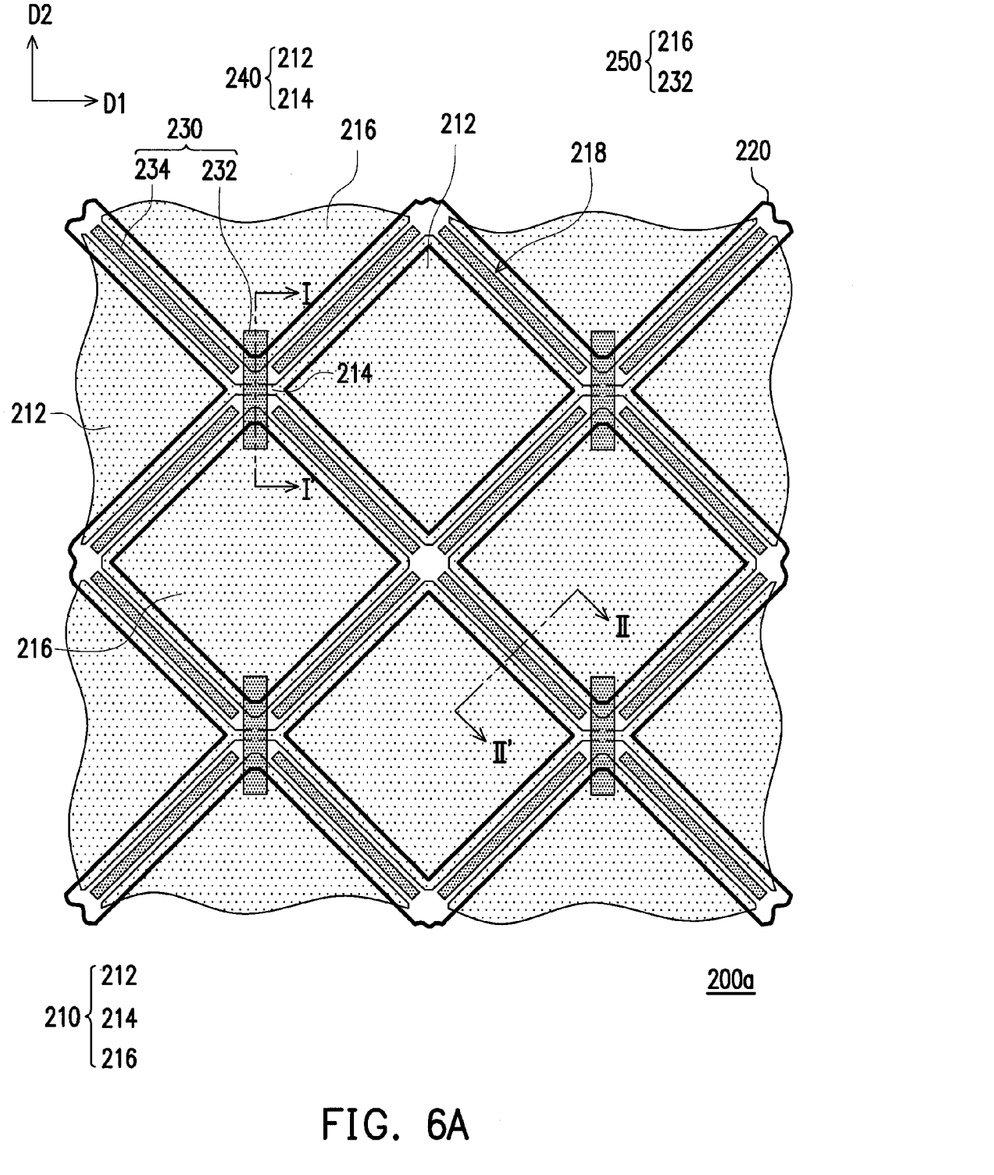
FIG. 6A is a schematic top view showing a touch panel according to an embodiment of the present invention.
Figure 6B:
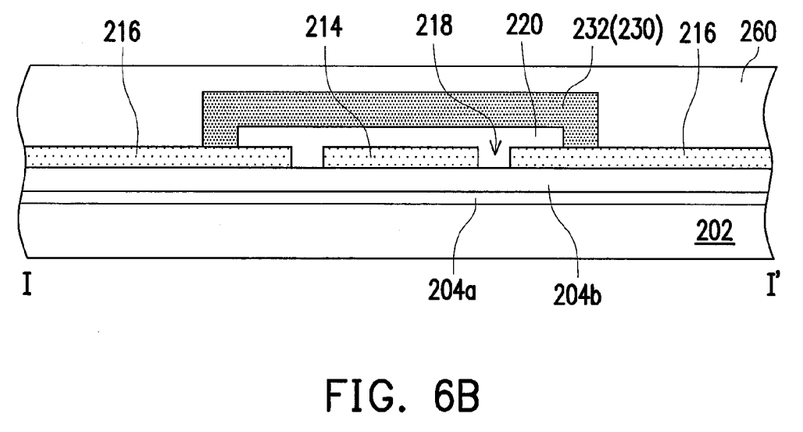
FIG. 6B is a schematic cross-sectional view along line I-I' of FIG. 6A.
Figure 6C:
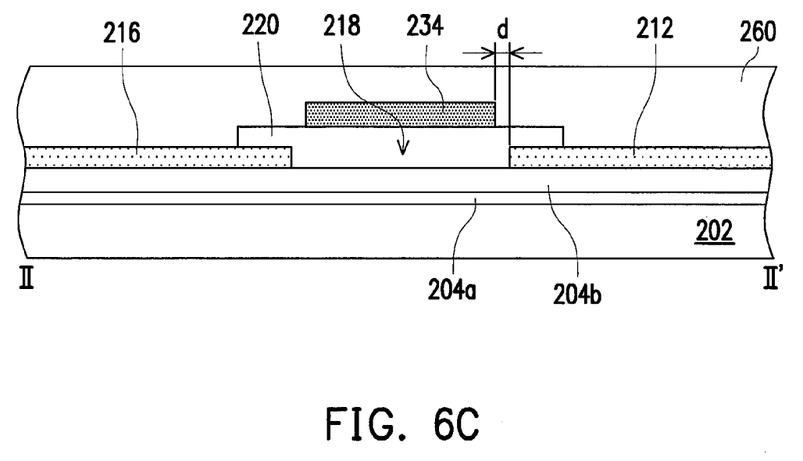
FIG. 6C is a schematic cross-sectional view along line II-II' of FIG. 6A.

FIG. 6A is a schematic top view showing a touch panel according to an embodiment of the present invention, FIG. 6B is a schematic cross-sectional view along line I-I' of FIG. 6A, and FIG. 6C is a schematic cross-sectional view along line II-II' of FIG. 6A. A touch panel 200a illustrated in FIG. 6A through FIG. 6C has a structure similar to the touch panel 200 illustrated on FIG. 3C, FIG. 4D and FIG. 5D, and the major difference therebetween lies in that touch panel 200a further includes dummy patterns 234. In the present embodiment, the second patterned conductive layer 230 includes, for example, a plurality of dummy patterns 234. At least one of the dummy patterns 234 is located between the two adjacent first sensing pad 212 and second sensing pad 216 and insulated from the two adjacent first sensing pad 212 and second sensing pad 216. A shortest horizontal distance d between the at least one of the dummy patterns and one of the two adjacent first sensing pad 212 and second sensing pad 216, for example, ranges from 0 um to 15 um, and preferably ranges from 0 to 5 um. In an embodiment, the shortest horizontal distance d is, for example, substantially equal to 0, and namely, a width of a dummy pattern 234 is substantially identical to that of a gap 218.

Generally, in a scenario where photolithography accuracy and etching capability are considered, when the dummy patterns and the sensing pads are located on the same layer, a distance between a dummy pattern and a sensing pad typically should be maintained within a range from approximately 25 um to 30 um. However, in the present embodiment, the dummy patterns 234 are arranged on the patterned passivation layer 220 between the first sensing pads 212 and the second sensing pads 216. That is to say, the dummy patterns 234 are located on a different layer from the first sensing pads 212 and the second sensing pads 216. Therefore, the arrangement of the dummy patterns 234 would not possibly cause a short-circuit between the first sensing pads 212 and the second sensing pads 216, and process requirements for forming the dummy patterns 234 is relatively accommodative as compared with the conventional fabricating process. Thus, the shortest horizontal distance d between the dummy pattern 234 and one of the adjacent first sensing pad 212 and second sensing pad 216 may be reduced as required, even down to 0.

Even further, the width of the dummy pattern 234 may be greater than the width of the gap 218, so as to achieve the purpose that the first sensing pads 212 and the second sensing pads 216 are invisible. Accordingly, the touch panel 200a not only has advantages of the preceding embodiment, but also has better visual effects.

Based on the above, in the touch panel and the method for fabricating the same of the present invention, a gap is formed between each two adjacent first sensing pad and second sensing pad, and the patterned passivation layer entirely covers the gaps and exposes at least a portion of each first sensing pad and at least a portion of each second sensing pads. Since the patterned passivation layer may prevent the layers exposed from the gaps being damaged, the material of the patterned passivation layer may be selected according to demand without considering an etching selectivity among the patterned passivation layer and the layers under the patterned passivation layer. Thus, material selection of the patterned passivation layer is significantly increased, so as to reduce the production cost of the patterned passivation layer and achieve a purpose of arranging a plurality of index-match layers between the first patterned conductive layer and the substrate. Moreover, since the patterned passivation layer is substantially filled in the gaps and disposed on the edge portions of the sensing pads, an area occupied by the patterned passivation layer on the substrate is relatively small. Therefore, the thickness of the patterned passivation layer does not easily influence the overall optical characteristics of the touch panel, and as a result, the touch panel has a better optical stability. Additionally, in an embodiment, the dummy patterns may be further arranged on the patterned passivation layer, so that the sensing pads are invisible and the visual effects of the touch panel are enhanced.

Moreover, the method for fabricating the touch panel may be easily integrated with current processes for fabricating touch panels, and the CVD machine for fabricating thin film transistors may be utilized to form the patterned passivation layer. Accordingly, the fabricating processes and production cost will not be significantly increased, and the production cost of the touch panel may even be reduced. Consequently, the touch panel has good optical characteristics, better optical stability and better visual effects as well as a better yield and reduced production cost.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A touch panel, comprising:
a substrate;
a first patterned conductive layer, located on the substrate and comprising a plurality of first sensing pads and a plurality of second sensing pads, wherein a gap is formed between two adjacent first sensing pad and second sensing pad;
a patterned passivation layer, located on the first patterned conductive layer, covering the gaps, and exposing at least a portion of each first sensing pad and at least a portion of each second sensing pad, wherein the patterned passivation layer is mesh-shaped; and
a second patterned conductive layer, located on the patterned passivation layer.

2. The touch panel according to claim 1, further comprising an insulating layer located on the first patterned conductive layer, the patterned passivation layer and the second patterned conductive layer, wherein the first patterned conductive layer further comprises a plurality of first bridging lines and each of the first bridging lines is electrically connected with two adjacent first sensing pads, the second patterned conductive layer comprises a plurality of second bridging lines and each of the second bridging lines is electrically connected with two adjacent second sensing pads, and the patterned passivation layer is further located between the plurality of first bridging lines and the plurality of second bridging lines.

3. The touch panel according to claim 1, further comprising a buffer layer located on the substrate, wherein the first patterned conductive layer is located on the buffer layer, the gaps expose the buffer layer, and a material of the buffer layer comprises $SiO_2$, $SiN_x$, $SiO_xN_y$, $Nb_2O_5$, $MgF_2$, $Al_2O_3$, $CeF_3$, $ZrO_2$, $TiO_2$, $Ta_2O_5$, ZnS or a combination thereof.

4. The touch panel according to claim 1, wherein a material of the patterned passivation layer comprises $SiO_2$, $SiN_x$, $SiO_xN_y$, $Nb_2O_5$, $MgF_2$, $Al_2O_3$, $CeF_3$, $ZrO_2$, $TiO_2$, $Ta_2O_5$, ZnS or a combination thereof, and a thickness of the patterned passivation layer ranges from 0.3 um to 2 um.

5. The touch panel according to claim 1, wherein the second patterned conductive layer comprises a plurality of dummy patterns, at least one of the dummy patterns is located between the two adjacent first sensing pad and second sensing pad and insulated from the two adjacent first sensing pad and second sensing pad, and a shortest horizontal distance between the at least one of the dummy patterns and one of the two adjacent first sensing pad and second sensing pad ranges from 0 um to 15 um.

6. The touch panel according to claim 1, wherein edge portions of the first sensing pads and the second sensing pads are substantially covered by the patterned passivation layer.

7. The touch panel according to claim 1, wherein a central portion of the top surface of each of the first sensing pads and the second sensing pads is exposed by the patterned passivation layer.

8. A method for fabricating a touch panel, comprising:
forming a first patterned conductive layer on a substrate, the first patterned conductive layer comprising a plurality of first sensing pads and a plurality of second sensing pads, wherein a gap is formed between two adjacent first sensing pad and second sensing pad;
forming a patterned passivation layer on the first patterned conductive layer, the patterned passivation layer covering the gaps and exposing at least a portion of each first sensing pad and at least a portion of each second sensing pad, wherein the patterned passivation layer is mesh-shaped; and
forming a second patterned conductive layer on the patterned passivation layer.

9. The method according to claim 8, wherein the first patterned conductive layer further comprises a plurality of first bridging lines and each of the first bridging lines is electrically connected with two adjacent first sensing pads, the second patterned conductive layer comprises a plurality of second bridging lines and each of the second bridging lines is electrically connected with two adjacent second sensing pads, and the patterned passivation layer is further located between the plurality of first bridging lines and the plurality of second bridging lines.

10. The method according to claim 8, further comprising forming a buffer layer on the substrate, the first patterned conductive layer being located on the buffer layer, and the gaps exposing the buffer layer, wherein a material of the buffer layer comprises $SiO_2$, $SiN_x$, $SiO_xN_y$, $Nb_2O_5$, $MgF_2$, $Al_2O_3$, $CeF_3$, $ZrO_2$, $TiO_2$, $Ta_2O_5$, ZnS or a combination thereof.

11. The method according to claim 8, further comprising forming an insulating layer on the first patterned conductive layer, the patterned passivation layer and the second patterned conductive layer, wherein a material of the patterned passivation layer comprises $SiO_2$, $SiN_x$, $SiO_xN_y$, $Nb_2O_5$, $MgF_2$, $Al_2O_3$, $CeF_3$, $ZrO_2$, $TiO_2$, $Ta_2O_5$, ZnS or a combination thereof, and a thickness of the patterned passivation layer ranges from 0.3 um to 2 um.

12. The method according to claim 8, wherein the second patterned conductive layer comprises a plurality of dummy patterns, at least one of the dummy patterns is located between the two adjacent first sensing pad and second sensing pad and insulated from the two adjacent first sensing pad and second sensing pad, and a shortest horizontal distance between the at least one of the dummy patterns and one of the two adjacent first sensing pad and second sensing pad ranges from 0 um to 15 um.

13. The method according to claim 8, wherein edge portions of the first sensing pads and the second sensing pads are substantially covered by the patterned passivation layer.

14. The method according to claim 8, wherein a central portion of the top surface of each of the first sensing pads and the second sensing pads is exposed by the patterned passivation layer.

15. A touch panel, comprising:
a substrate;
a first patterned conductive layer, located on the substrate and comprising a plurality of first sensing pads and a plurality of second sensing pads, wherein each of a plurality of X-shaped gaps is formed by two adjacent first sensing pads and two adjacent second sensing pads;
a patterned passivation layer, located on the first patterned conductive layer, and completely covers the plurality of X-shaped gaps, and exposing at least a portion of each first sensing pad and at least a portion of each second sensing pad; and
a second patterned conductive layer, located on the patterned passivation layer.

16. A touch panel, comprising:
a substrate;
a first patterned conductive layer, located on the substrate and comprising a plurality of first sensing pads and a plurality of second sensing pads, wherein a gap is formed between two adjacent first sensing pad and second sensing pad and the gap is extending along an edge of one of the two adjacent first sensing pad and second sensing pad;
a patterned passivation layer, located on the first patterned conductive layer, completely covering the gaps to expose at least a portion of each first sensing pad and at least a portion of each second sensing pad; and
a second patterned conductive layer, located on the patterned passivation layer.

17. The method according to claim 16, wherein a portion of the patterned passivation layer is substantially filled in the gaps and covers at least an edge portion of one of the first sensing pads or the second sensing pads.

* * * * *